R. W. WOOD.
METHOD OF MAKING LIGHT DIFFUSING SCREENS.
APPLICATION FILED MAY 29, 1913.

1,240,398.

Patented Sept. 18, 1917.

Witnesses
E. G. Marshall
M. P. Imirie

Inventor
R. W. Wood,
By John H. Holt
his Attorney

UNITED STATES PATENT OFFICE.

ROBERT W. WOOD, OF BALTIMORE, MARYLAND.

METHOD OF MAKING LIGHT-DIFFUSING SCREENS.

1,240,398.  Specification of Letters Patent.  Patented Sept. 18, 1917.

Application filed May 29, 1913. Serial No. 770,672.

*To all whom it may concern:*

Be it known that I, ROBERT W. WOOD, a citizen of the United States, residing at Baltimore city and State of Maryland, have invented certain new and useful Improvements in Methods of Making Light-Diffusing Screens, of which the following is a specification.

An ordinary ground glass screen, while diffusing the transmitted light very perfectly, transmits only from 60% to 70% of the total light which falls upon it, reflecting back a large proportion of the light. This results from the circumstance that the surface of the glass is cut into irregular crevices, pits and grooves of considerable depth, the pits reflecting the light at a large angle of incidence, often in a to-and-fro manner, either returning it toward the source, or scattering it laterally within the glass plate.

This unfavorable action I have overcome by treating the surface of the glass by a process which gives it a structure of considerable regularity, the surface being covered with very minute smooth depressions similar to concave lenses. These lenses are not necessarily regular in outline, but are contiguous; that is, they run together along their edges, the whole forming a cellular structure when viewed under the microscope, totally different in appearance from the surface of glass plates ground or etched by the usual methods. These microscopical lenses, which cover the surface, diffuse the light in a very perfect manner and transmit practically all of the light, the loss due to reflection from the steep sides of irregularly formed pits being absent in this case.

Figure 1:
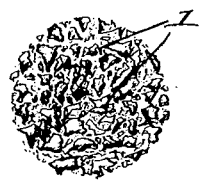
Figure 2:
Figure 3:
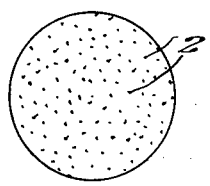
Figure 4:
Figure 5:
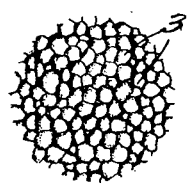
Figure 6:

Referring to the accompanying drawing:

Figure 1, represents in top plan the surface of an ordinary ground glass plate, as viewed under a microscope;

Fig. 2, an enlarged cross-section of the same;

Fig. 3, a top plan view of the surface of a glass plate as viewed under a microscope, and pitted by an air blast as in the first step of the process herein described;

Fig. 4, an enlarged cross-section thereof;

Fig. 5, a top plan view as seen under a microscope, of a glass plate after the pits have been treated according to my process to form concave lenses, and Fig. 6, an enlarged cross-section thereof.

One embodiment of my method of making such screens is as follows: A blast of air charged with a fine dust of flour emery or carborundum is caused to play over the surface of the glass, for a few seconds. The effect is to produce a very slight cloudiness of the surface, which is scarcely noticeable. Each grain of dust has, however, produced a microscopical dent in the surface by chipping out a minute fragment of glass. The surface is now flowed with hydrofluoric acid, which enlarges and smooths out the pits made by the emery dust grains into the minute concave lenses previously alluded to.

When the acid has done its work, the plate is washed to remove the acid. The time the acid has to stay on the plate may be readily determined by experiment, and after one has become accustomed to the process, the appearance of the glass itself will show when the acid has done its work.

In the accompanying drawings, 1 indicates the crevices formed in the surface of ordinary ground glass; 2, the microscopic dents or pits made by the emery dust grains according to the method herein described, and 3, the minute concave lenses formed by enlarging and smoothing the pits 2, as herein described.

The diffusing power of a plate prepared in this way is fully equal to that of the usual ground glass, while the intensity of the transmitted light is very nearly double that transmitted by such ground glass.

When placed before a dark back-ground, and illuminated, my glass appears very nearly as black as ordinary untreated glass, in contrast to the milky white appearance of ordinary ground glass. This makes it of great value as a focusing screen for cameras. The image formed by the lens upon a glass screen prepared in this way, is by actual measurement double the brilliancy of the image seen on ordinary ground glass, and as the cellular surface reflects little or no light, the use of the black focusing cloth can be dispensed with even out of doors in full sunlight. It is of especial value in the case of cameras of the Graflex type, which suffer somewhat from insufficient brilliancy of the image on the focusing screen.

Such a screen is also useful for rendering the bulbs of incandescent lamps diffusing without at the same time causing the very marked loss in the efficiency of the lamp, which results from frosting the bulbs in the usual manner.

It should be understood that the emery blast operation to which I subject the glass does not produce a surface similar to the ordinary ground glass surface; in my case the pits are separated from each other much more than in the case of ground glass, as will be readily seen from a comparison of Figs. 1 and 3.

The average diameters of the concave lenses which form the cellular surface can be varied by modifying the treatment of the surface previous to the action of the acid. By employing a less strong blast of air and allowing it to act for a longer time the microscopic pits are smaller and more numerous, which results in the production of a cellular structure of finer grain, and a wider angle of diffusion. By controlling in this way the size of the lenses and the depth to which they are excavated, it is possible to vary the angle through which the light is diffused, small angles being better suited to certain purposes than large angles, for example, in the case of window glass in which it is desired that most of the light passes through without excessive lateral diffusion, and here I may remark, when this glass is used in windows it has very much more the appearance of ordinary clear window glass than has the usual ground glass; that is to say, it reflects considerably less light and, therefore, does not present the white or frosty appearance to anything like the extent of the usual ground glass.

While my invention is particularly well adapted to the specific uses herein mentioned, it may have a variety of other applications which it is hardly worth while to here enumerate.

It should also be understood that the specific method set forth herein may be modified without departing from the scope of what I claim.

What I claim is:

1. The method of making a light diffusing screen, which consists in forming in a glass surface a multiplicity of minute pits separated by a plane surface relatively wide as compared with the depth of the pits, then enlarging these pits into contiguous concave depressions, whereby each such depression forms a surface of a concave lens.

2. The method of making a light diffusing screen, which consists in forming in a glass surface by mechanical abrasion a multiplicity of irregular pits separated by a plane surface relatively wide as compared with the depth of the pits, and then smoothing out and enlarging these pits into contiguous concave depressions by the application of acid to the pitted surface of said glass, and then removing the acid therefrom, each of said depressions forming the surface of a concave lens.

3. The method of making a light diffusing screen, which consists in applying a blast of abrasive material to a glass surface and thereby forming in said surface a multiplicity of pits separated by a plane surface relatively wide as compared with the depth of the pits, flowing the pitted surface of said glass with hydrofluoric acid and thereby enlarging said pits into contiguous smooth concave depressions, and then removing the acid from said glass.

In testimony whereof I affix my signature in presence of two witnesses.

ROBERT W. WOOD.

Witnesses:
 ADRIAN GRAPE,
 CHAS. A. NICHOLSON.